Oct. 7, 1941.  F. LAESSKER  2,258,510

METHOD AND MACHINE FOR GRINDING TOOTHED SPUR WHEELS

Filed Aug. 11, 1939  2 Sheets-Sheet 1

Inventor:
Fritz Laessker
by S. Sokal,
Attorney.

Oct. 7, 1941.  F. LAESSKER  2,258,510
METHOD AND MACHINE FOR GRINDING TOOTHED SPUR WHEELS
Filed Aug. 11, 1939  2 Sheets-Sheet 2
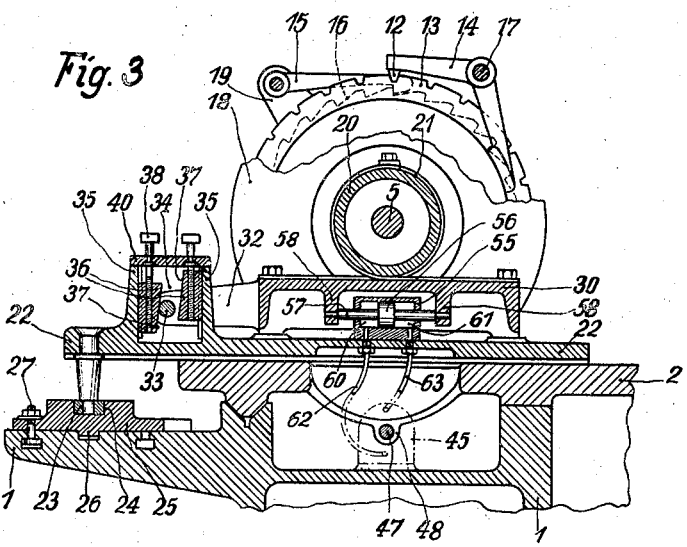
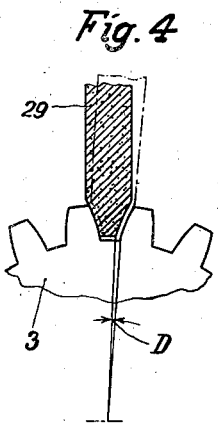
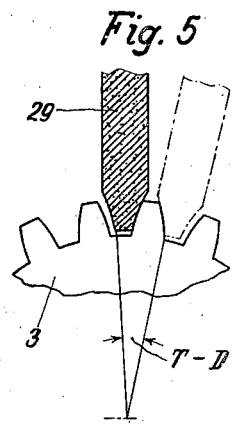

Patented Oct. 7, 1941

2,258,510

UNITED STATES PATENT OFFICE 2,258,510

METHOD AND MACHINE FOR GRINDING TOOTHED SPUR WHEELS

Fritz Laessker, Friedrichshafen-on-the-Bodensee, Germany, assignor to Zahnradfabrik Friedrichshafen Aktiengesellschaft, Friedrichshafen-on-the-Bodensee, Germany Application August 11, 1939, Serial No. 289,620
In Germany August 22, 1938

15 Claims. (Cl. 51—123)

This invention relates to a method of and machine for the grinding of straight and inclined toothed spur wheels as well as internal teeth by means of a grinding disc which is profiled on both sides corresponding to the tooth profile, of the workpiece, to be generated.

The essence of the invention consists in that one working face of the grinding disc contacts at any time only one tooth flank, whilst the other working face is spaced from the opposite tooth flank and a left and a right tooth flank is ground on the workpiece alternately in succession during each working stroke. The arrangement can, moreover, be such that either the two tooth flanks within one tooth space are ground alternately and are then moved through a division or first the one and then the other tooth flank of the same tooth are alternately ground and subsequently moved through a division.

For carrying out the method, a grinding machine is advantageously provided with a device, which effects an additional swinging of the pinion to be ground around its axis and thus with respect to the grinding disc, independently of the dividing or any screw movement, to an amount equal to the amount by which the working face of the grinding disc, which is temporarily not acting on the pinion, is spaced from the opposite tooth flank and, after the completion of the grinding of one tooth flank in the one working direction, the additional swinging of the pinion is carried out, and the opposite tooth flank is ground in the other working direction.

The alternation in the working first of one tooth flank and then of the other can also be so carried out that the grinding disc is swung through a suitable amount instead of the workpiece, but it has been shown to be more advantageous to use a device which swings the pinion to be ground.

The invention offers very essential advantages compared with the known methods of grinding, according to which, for example, by means of a grinding disc profiled only on one side first all the left hand tooth flanks are ground and then, after re-setting of the workpiece, carried between centres, all the right hand tooth flanks are ground.

Above all the grinding capacity is increased as with each stroke of the machine in each direction a new tooth profile face is swept by the grinding disc. On the grinding of spur wheels or pinions with screw-like running teeth, the increase in the grinding capacity is still greater as, in this case, the grinding disc, owing to the flexibility or yielding in the screw drive, hitherto only ground in one direction of stroke. A further advantage of the invention consists in that the ground product is improved or enhanced in that both tooth profile faces are gradually successively ground and a complete stress equalisation results on the engagement of the tooth faces. This is not possible with the earlier method in which first all the left hand and then all the right hand tooth flanks are ground, because the stresses released on the grinding of the right flanks distort the finished left hand flanks or the whole pinion. As, in accordance with the invention, it is no longer necessary to re-set the workpiece carried between centres from time to time, the left and right tooth flanks of the ground pinions revolve better relatively to one another. Owing to the omission of this necessity for re-setting the workpiece, it is not necessary, in the case of workpieces which are provided with external teeth, to arrange them centrally of the length of the arbor.

In order that the invention may be fully understood, I shall now describe one embodiment thereof by way of example by reference to the accompanying drawings, which show a machine in which the pinion to be ground undergoes the swinging movement.

Fig. 3 is a cross section on the line III—III of Fig. 1.

Fig. 4 is a view of part of a pinion with a radially sectioned grinding disc, which bears alternately on the two flanks of the same tooth space, and Fig. 5 is a similar view to Fig. 4, but in this case the grinding disc bears alternately on the flanks of the same tooth.

Figure 1:
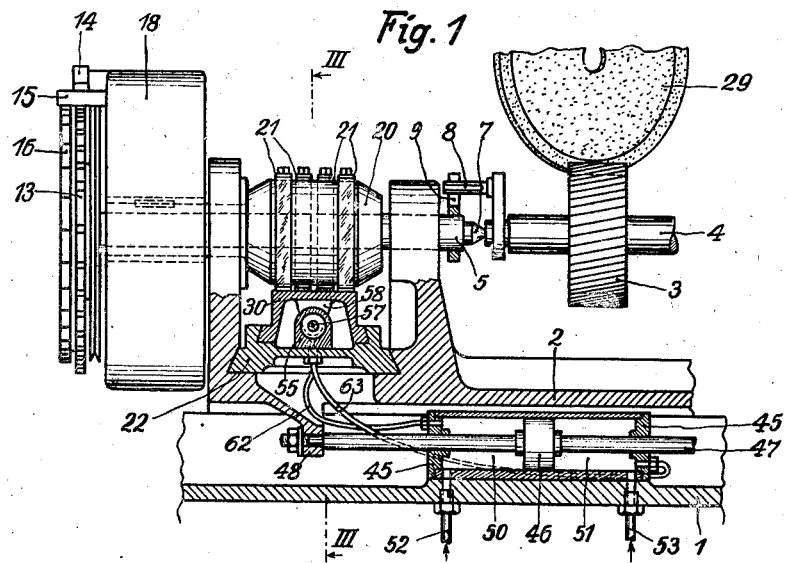
Fig. 1 is a side elevation of the essential parts, the machine bed and table slide being shown in section.
Figure 2:
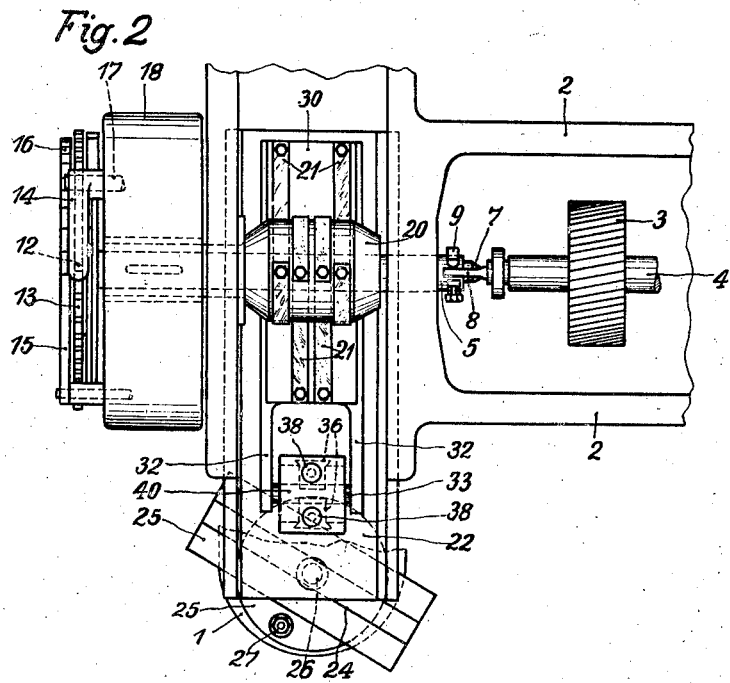
Fig. 2 is a plan view thereof.

In the table slide 2 carried in the machine bed 1 are mounted the centres between which is carried the mandrel 4 carrying the gear workpiece 3. The centre 7 is arranged in a dividing spindle 5 which carries the carrier arm 9. To the spindle 5 is connected the dividing apparatus for the workpiece, which consists in the usual manner, of the index pin 12 with the dividing disc 13, the index pin lever 14 and the feeding mechanism consisting of the pawl 15 and the locking disc 16. The pawl 15 is carried by a swinging arm 19 whilst the index pin lever 14 can swing around the bearing pin 17 of a casing 18 with which the drum 20 is connected. The individual parts for actuating the dividing apparatus within the casing 18 are not illustrated in the drawings.

The arrangement shown in the drawings relates to a grinding machine which is suitable for the grinding of spur pinions or wheels with straight and screw-like running teeth. For effecting the screw movement there is provided a rolling device with bands 21 laid over the drum 20 and secured thereon, which bands, on the other hand, lead to a slide 22 transversely guided in the table slide 2. The slide 22 engages by means of a pin 23 in a groove 24 arranged on the stationary machine bed 1, which groove is set at a definite angle so that the screw movement of the pinion to be ground is effected in a known manner on the movement of the table slide 2. The groove 24 is cut into a block 25 which swings around a pin 26 and is fixable by means of a screw 27 in any required position. If straight toothed pinions are to be ground on the grinding machine then the block 25 is so adjusted that the groove 24 lies parallel to the table slide 2. Consequently on the longitudinal movement of the table slide, the slide 22 does not move.

The grinding disc 29 is shown in Fig. 1, and in Fig. 4 there is shown a radial section of the grinding disc in contact with one tooth flank of a pinion, the opposite tooth flank in the same tooth space being left free. Fig. 5 shows a similar sectional view but in this case the pinion is so displaced that a left and a right tooth flank of the same tooth is alternately ground.

For producing the swinging of the pinion for the purpose of passing from the working of one tooth flank to the opposite tooth flank, the transverse slide 22 provided in the table slide 2 of the grinding machine has, for example, an upper part 30 carrying the rolling bands 21, which is displaceable relatively to the transverse slide 22 through an amount equal to the amount through which the working faces of the grinding discs 29 are displaced with respect to the tooth flanks. For this purpose the upper part 30 is guided in a slideway formed in the slide 22. The displacing movement is, for example, limited in that a pin 33 carried on the upper part 30 by means of arms 32 engages in a slot 34 variable in breadth. The breadth of the slot is adjustable to the necessary amount of movement of the upper part 30. The slide 22 is formed with guide cheeks 35 in which are adjustable, by means of screws 38, carried in the transverse member 40 secured to the guide cheeks 35, two blocks 36 with parallelly directed wedge faces 37.

In the example illustrated in the drawings, it is assumed that the mechanism, particularly the table slide 2, is actuated by fluid pressure. Accordingly the machine bed 1 is provided with a cylinder 45 in which is movable a piston 46, the piston rod 47 of which engages projections 48 formed on the table slide 2. Pressure medium conduits 52 and 53 lead to the cylinder spaces 50 and 51 located in front of and behind the piston 46. The control of the pressure medium is effected in any known manner and the means for effecting this control have been omitted from the drawings.

The movement of the upper part 30 with respect to the slide 22 is, in the same manner, effected by fluid pressure, for which purpose a cylinder 55 is secured to the slide 22, which cylinder contains a piston 56. The latter is carried by the piston rod 57 which is mounted at its ends in projections 58 of the upper part 30.

Pressure medium conduits 62 and 63, which are connected to the cylinder spaces 50 and 51, lead to the cylinder spaces 60 and 61 in front of and behind the piston 56. By this arrangement the workpiece can be swung with respect to the grinding disc automatically with the control of the table slide without any separate control means.

If the opposite tooth flanks of one tooth space are to be ground in succession, then a relative variation in position of the grinding disc as indicated in Fig. 4 in full and dotted lines corresponds to the swinging of the pinion. The swinging angle is in this case indicated by D.

On grinding first one and then the other flank of the same tooth, as shown in Fig. 5, the relative swinging of the grinding disc is effected through an angle T—D, which is smaller than the full dividing angle by the amount D of the adidtional swinging of the pinion.

I claim:

1. Apparatus for grinding straight toothed spur pinions comprising the sub-combination of: a frame; a rotatable grinding disc associated with said frame, said grinding disc being profiled on both sides thereof corresponding to the tooth profile to be generated on the pinion and said disc being so dimensioned and located that at any one time one working surface only thereof contacts with one tooth flank of the pinion, whilst the other working face is spaced from the opposite tooth flank; supporting means for the pinion to be ground; means for moving said pinion supporting means axially of the pinion without rotation during the grinding of one tooth flank, and movable axially of the pinion in the opposite direction without rotation during the grinding of an opposite tooth flank; and means operable between successive working strokes in opposite directions for rotating said pinion so as to bring an opposite tooth flank into engagement with said other working face of said grinding disc.

2. Apparatus for grinding straight and inclined toothed spur pinions comprising the sub-combination of: a frame; a table slide reciprocably mounted in said frame; a pinion supporting means rotatably mounted in said slide; a rotatable grinding disc operatively associated with said pinion supporting means, said grinding disc being profiled on both sides thereof corresponding to the tooth profile to be generated on the pinion, and said disc being dimensioned smaller than a tooth space so that when one working face thereof is in contact with one tooth flank, the other working face thereof is spaced from the opposite tooth flank in said tooth space; a dividing mechanism carried by said slide for intermittently moving said pinion supporting means through an amount equal to a tooth division of the pinion carried thereby; and additional means operable between successive working strokes of said slide for rotating said pinion through a distance equal to the free spacing between the inactive working face of the grinding disc and the pertaining tooth flank for the purpose of bringing said tooth flank into contact with said working face for effecting a working operation thereon.

3. Apparatus for grinding straight and inclined toothed spur pinions comprising the sub-combination of: a frame; a table slide reciprocably mounted in said frame; a pinion supporting means rotatably mounted in said slide; a rotatable grinding disc operatively associated with said pinion supporting means, said grinding disc being profiled on both sides thereof corresponding to the tooth profile to be generated on the pinion and said disc being dimensioned smaller than a tooth space so that when one working face thereof is in contact with one tooth flank, the other working face thereof is spaced from the opposite tooth flank in said tooth space; a dividing mechanism carried by said slide for intermittently moving said pinion supporting means through an amount equal to a tooth division of the pinion carried thereby; adidtional means operable between successive working strokes of said slide for rotating said pinion through a distance equal to the free spacing between the inactive working face of the grinding disc and the pertaining tooth flank for the purpose of bringing said tooth flank into contact with said working face for effecting a working operation thereon; and means for adjusting the amount of said additional rotation as desired.

4. Apparatus for grinding straight and inclined toothed spur pinions comprising the subcombination of: a frame; a table-slide longitudinally reciprocably mounted in said frame; pinion supporting means rotatably mounted in said slide; a rotatable grinding disc associated with said supporting means, said grinding disc being profiled on both sides thereof corresponding to the tooth profile to be generated on a pinion and said disc being dimensioned smaller than a tooth space of the pinion so that, when one working face thereof is in contact with one tooth flank, the other working face thereof is spaced from the opposite tooth flank in said tooth space; means for longitudinally reciprocating said table-slide and means operable by said table-slide reciprocating means, after the grinding of one tooth flank by one face of the grinding disc in one working direction, to rotate said pinion supporting means so as to rotate the pinion carried thereby and bring an opposite tooth flank into contact with the previously inactive working face of the grinding disc for effecting a working operation thereon during the next succeeding working stroke in the opposite working direction.

5. Apparatus for grinding straight and inclined toothed spur pinions comprising the subcombination of: a frame; a table slide reciprocably mounted in said frame; a pinion supporting means rotatably mounted in said slide; a rotatable grinding disc operatively associated with said pinion supporting means, said grinding disc being profiled on both sides thereof corresponding to the tooth profile to be generated on the pinion and said disc being dimensioned smaller than a tooth space so that when one working face thereof is in contact with one tooth flank, the other working face thereof is spaced from the opposite tooth flank in said tooth space; a dividing mechanism carried by said slide for intermittently moving said pinion supporting means through an amount equal to a tooth division of the pinion carried thereby, means for reciprocating said table-slide; and means operable by said reciprocating means, after the grinding of one tooth flank by one face of the grinding disc in one working direction, to rotate said pinion supporting means so as to rotate the pinion carried thereby and bring an opposite tooth flank into contact with the previously inactive working face of the grinding disc for effecting a working operation thereon during the next succeeding working stroke in the opposite direction.

6. Apparatus for grinding straight and inclined toothed spur pinions comprising the subcombination of: a frame; a table-slide reciprocably mounted in said frame; pinion supporting means rotatably mounted in said slide; a rotatable grinding disc associated with said pinion supporting means, said grinding disc being profiled on both sides thereof corresponding to th tooth profile to be generated on a pinion carried by said supporting means, and said disc being dimensioned smaller than a tooth space so that, when one working face thereof is in contact with one tooth flank, the other working face thereof is spaced from the opposite tooth flank in said tooth space; means operable on longitudinal movement of said slide for rotating said pinion supporting means so as to impart a screw motion to a pinion carried thereby, said means including a transversely movable slide carried by said table-slide, a drum carried by said rotatable pinion supporting means, bands connecting said drum and said transversely movable slide and means for displacing said slide during movement of said table slide, whereby said drum is rotated to rotate said pinion supporting means; means for reciprocating said table-slide and additional means, operable by said reciprocating means between successive working strokes thereof in opposite directions, for rotating said drum together with said pinion supporting means through an amount equal to the free spacing between the inactive working face of the grinding disc and the pertaining tooth flank for the purpose of bringing said tooth flank into contact with said working face for effecting a working operation thereon.

7. Apparatus for grinding straight and inclined toothed spur pinions comprising the subcombination of: a frame; a table slide reciprocably mounted in said frame; pinion supporting means rotatably mounted in said slide; a rotatable grinding disc associated with said pinion supporting means, said grinding disc being profiled on both sides thereof corresponding to the tooth profile to be generated on a pinion carried by said supporting means and said disc being dimensioned smaller than a tooth space so that, when one working face thereof is in contact with one tooth flank, the other working face thereof is spaced from the opposite tooth flank in said tooth space; a dividing mechanism carried by said slide for intermittently moving said pinion supporting means through an amount equal to a tooth division of the pinion carried thereby; means operable on longitudinal movement of said slide for rotating said pinion supporting means so as to impart a screw motion to a pinion carried thereby, said means including a transversely movable slide carried by said table slide, a drum carried by said rotatable pinion supporting means, bands connecting said drum and said transversely movable slide and means for displacing said slide during movement of said table slide, whereby said drum is rotated to rotate said pinion supporting means; means for reciprocating said table-slide and additional means, operable by said reciprocating means between successive working strokes thereof in opposite directions, for rotating said drum together with said pinion supporting means through an amount equal to a tooth division less an amount equal to the free spacing between the inactive working face of the grinding disc and the pertaining tooth flank for the purpose of bringing the other flank of a tooth, one flank of which has already been ground by one face of said grinding disc, into contact with the other working face of said disc for effecting a working operation thereon.

8. Apparatus for grinding straight and inclined toothed spur pinions comprising the subcombination of: a frame; a table slide reciprocably mounted in said frame; pinion supporting means rotatably mounted in said slide; a rotatable grinding disc associated with said pinion supporting means, said grinding disc being profiled on both sides thereof corresponding to the tooth profile to be generated on a pinion carried by said supporting means and said disc being dimensioned smaller than a tooth space so that, when one working face thereof is in contact with one tooth flank, the other working face thereof is spaced from the opposite tooth flank in said tooth space; a transversely movable slide carried by said table slide; a drum carried by said rotatable pinion supporting means; bands connecting said drum to said transversely movable slide; first fluid pressure operated means for reciprocating said table slide and second fluid pressure means operable by said first fluid pressure operated means, after the grinding of one tooth flank by one face of the grinding disc in one working direction, to move said transverse slide whereby said drum and said pinion supporting means are rotated through a predetermined amount to bring an opposite tooth flank into contact with the previously inoperative face of the grinding disc for effecting a working operation thereon during the next succeeding working stroke in the opposite direction.

9. Apparatus for grinding straight and inclined toothed spur pinions comprising the subcombination of: a frame; a table slide reciprocably mounted in said frame; pinion supporting means rotatably mounted in said slide; a rotatable grinding disc associated with said pinion supporting means, said grinding disc being profiled on both sides thereof corresponding to the tooth profile to be generated on a pinion carried by said supporting means and said disc being dimensioned smaller than a tooth space so that, when one working face thereof is in contact with one tooth flank, the other working face is spaced from the opposite tooth flank in said tooth space; a transversely movable slide carried by said table slide; a second slide movably mounted in said transverse slide; a drum carried by said rotatable pinion supporting means; bands connecting said drum to said second slide; a piston operatively connected to said table slide; a second piston operatively connected to said second slide; fluid pressure means for reciprocating said first piston, said pressure means being also operable after the grinding of one tooth flank by one face of the grinding disc in one working direction to move said second slide whereby said drum and said pinion supporting means are rotated through a predetermined amount to bring an opposite tooth flank into contact with the previously inoperative face of the grinding disc for effecting a working operation thereon during the next succeeding working stroke in the opposite direction and said second slide normally being movable with said transverse slide on which it is mounted and means, operable on longitudinal movement of said table slide, for reciprocating said transverse slide during a grinding operation whereby said drum is rotated to impart a screw motion to a pinion carried by said pinion supporting means.

10. Apparatus for grinding straight and inclined toothed spur pinions comprising the subcombination of: a frame; a table-slide longitudinally reciprocably mounted in said frame; pinion supporting means rotatably mounted in said slide; a rotatable grinding disc associated with said supporting means, said grinding disc being profiled on both sides thereof corresponding to the tooth profile to be generated on a pinion and said disc being dimensioned smaller than a tooth space of the pinion so that, when one working face thereof is in contact with one tooth flank, the other working face thereof is spaced from the opposite tooth flank in said tooth space; means for longitudinally reciprocating said table-slide; means operable by said table-slide reciprocating means, after the grinding of one tooth flank by one face of the grinding disc in one working direction, to rotate said pinion supporting means so as to rotate the pinion carried thereby and bring an opposite tooth flank into contact with the previously inactive working face of the grinding disc for effecting a working operation thereon during the next succeeding working stroke in the opposite working direction; and a common control device for said table-slide reciprocating means and said pinion support rotating means.

11. Apparatus for grinding straight and inclined toothed spur pinions comprising the subcombination of: a frame; means on said frame for axially movably and rotatably supporting a pinion to be ground; a rotatable grinding disc associated with said frame, said grinding disc being profiled on both sides thereof corresponding to the tooth profile to be generated on the pinion and said disc being so dimensioned and located that at any one time one working surface only thereof contacts with one tooth flank of the pinion, whilst the other working face is spaced from the opposite tooth flank; and pressure medium operated means operable between successive working strokes in opposite directions for effecting relative movement between said grinding disc and said pinion so as to bring an opposite tooth flank into engagement with said other working face of said grinding disc.

12. A method of grinding straight toothed pinions with a grinding disc profiled to the desired profile of the pinion teeth which includes moving the gear axially with a profiled face of the grinding disc in working contact with one flank of a tooth, and thereby, without rotating the pinion, progressively grinding the entire length of said tooth flank, and at the end of the axial movement of the gear upon completing the grinding of said tooth flank rotating the pinion to bring the opposite flank of the next tooth in the same tooth space as the tooth flank already ground into contact with another profiled face of the grinding disc, and then moving the pinion axially in the opposite direction without rotation to progressively grind the entire length of said opposite flank of the next tooth.

13. The method of grinding inclined toothed spur pinions with a grinding disc profiled to correspond to the desired tooth profile, including moving the pinion axially in one direction with the flank of one tooth fitted to a profiled surface of the grinding disc, and during axial movement rotating the gear gradually according to the tooth inclination of the pinion so as to maintain the tooth flank being ground fitted to the profiled surface of the grinding disc, and after grinding the tooth flank throughout its length rotating the pinion to bring the opposite flank of the next tooth in the same tooth space with the tooth flank already ground into working contact with another profiled surface of the grinding disc, then moving the pinion axially in the opposite direction, and during axial movement rotating the pinion in accordance with the inclination of the pinion teeth to maintain said opposite tooth flank fitted to the profiled surface of the grinding disc.

14. A method of grinding straight and inclined toothed spur pinions with a grinding disc profiled to correspond to the desired tooth profile, including moving the pinion in one direction with one flank of a tooth fitted to a profiled surface of the grinding disc and progressively grinding said first tooth flank throughout its entire length, then at the end of said movement in one direction rotating the pinion to bring the second flank of the same tooth into position to fit another profiled surface of the grinding disc, and thereafter moving the pinion in the opposite direction with the second tooth flank fitted to said grinding disc surface to progressively grind the second tooth flank throughout its entire length.

15. Apparatus for grinding inclined toothed spur pinions comprising the sub-combination of: a frame; a rotatable grinding disc associated with said frame, said grinding disc being profiled on both sides thereof corresponding to the tooth profile to be generated on the pinion and said disc being so dimensioned and located that at any one time one working surface only thereof contacts with one tooth flank of the pinion, whilst the other working surface is spaced from the opposite tooth flank; supporting means for the pinion movable on the frame axially of the pinion, means for rotating the pinion gradually during axial movement of its supporting means in accordance with the tooth inclination of the pinion; means for moving the pinion supporting means axially in one direction during the grinding of one tooth flank, and for moving the supporting means axially in the other direction during the grinding of an opposite tooth flank; and means operable between successive working strokes in opposite directions, for rotating said pinion so as to bring an opposite tooth flank into engagement with said other working face of said grinding disc.

FRITZ LAESSKER.